(12) United States Patent
Khairmode et al.

(10) Patent No.: US 8,219,142 B2
(45) Date of Patent: Jul. 10, 2012

(54) METHOD, SYSTEM, AND APPARATUS FOR COEXISTENCE OF PLURALITY OF COMMUNICATION TECHNOLOGIES IN COMMUNICATION DEVICE

(75) Inventors: Vijay Khairmode, Santa Clara, CA (US); Murali Padmanabhan, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 689 days.

(21) Appl. No.: 12/322,216

(22) Filed: Jan. 29, 2009

(65) Prior Publication Data

US 2009/0197639 A1 Aug. 6, 2009

(30) Foreign Application Priority Data

Feb. 1, 2008 (IN) .............................. 283/CHE/2008

(51) Int. Cl.
*H04M 1/00* (2006.01)
*H04M 11/00* (2006.01)
*H04B 1/38* (2006.01)

(52) U.S. Cl. .................................................. 455/552.1

(58) Field of Classification Search ............... 455/553.1, 455/502, 41.1, 41.2, 552.1, 440.1, 73
See application file for complete search history.

(56) References Cited

U.S. PATENT DOCUMENTS 8,046,024 B2 * 10/2011 Sudak et al. ............... 455/552.1

* cited by examiner

*Primary Examiner* — Tilahun B Gesesse
(74) *Attorney, Agent, or Firm* — Sterne, Kessler, Goldstein & Fox P.L.L.C.

(57) ABSTRACT

A method and system for enabling coexistence of a plurality of communication technologies in a communication device is provided. The method includes determining a time offset between a first communication event of a first communication technology of the plurality of communication technologies and a second communication event of a second communication technology of the plurality of communication technologies. The method further includes altering a first communication state of one or more of the first communication technology and the second communication technology to a second communication state based on one or more of the time offset and a plurality of parameters of one or more of the first communication technology and the second communication technology.

34 Claims, 10 Drawing Sheets

METHOD, SYSTEM, AND APPARATUS FOR COEXISTENCE OF PLURALITY OF COMMUNICATION TECHNOLOGIES IN COMMUNICATION DEVICE

CROSS-REFERENCE TO RELATED-APPLICATION(s)

This application claims the benefit of Indian Provisional Application No. 283/CHE/2008, filed on Feb. 1, 2008.

BACKGROUND OF THE INVENTION

The present invention relates generally to wireless communication networks and more specifically to providing method and system for enabling coexistence of a plurality of communication technologies on a communication device.

Wireless communication cover various types of services like radio frequency communication, microwave communication and short range communication. Over the years, wireless communication devices have evolved from simple devices like cellular phones and pagers to multi-radio devices having greater communication capabilities. A multi-radio device supports a plurality of communication technologies.

However, simultaneous use of a plurality of radios associated with the plurality of communication technologies by a multi-radio device causes performance problems, for example, interference. This interference is caused in the multi-radio device when each of the plurality of radios operate in adjacent/overlapping frequency bands/channels. As a result of this interference, a transceiver of the co-located transceivers in the multi-radio device fail to distinguish between, a desired signal meant for its own processing and an undesired signal meant for processing by a co-located transceiver. Consequently, such interference causes degradation of quality of service, for example, poor quality of voice, errors in data sent/received, and complete loss of a communication link.

Some of the existing technologies use RF filters to reduce the effects of this interference. However, the selectivity of such RF filters is generally poor. Moreover, the cost involved in manufacturing a high selectivity RF filter is very high.

There is therefore a need for method and system that mitigates interference on a communication device that supports a plurality of communication technologies.

BRIEF DESCRIPTION OF DRAWINGS

A more complete description of the invention is provided by reference to the following detailed description when considered in conjunction with the accompanying drawings in which reference symbols indicate the same or similar components, wherein.

DETAILED DESCRIPTION OF THE DRAWINGS

Figure 1:
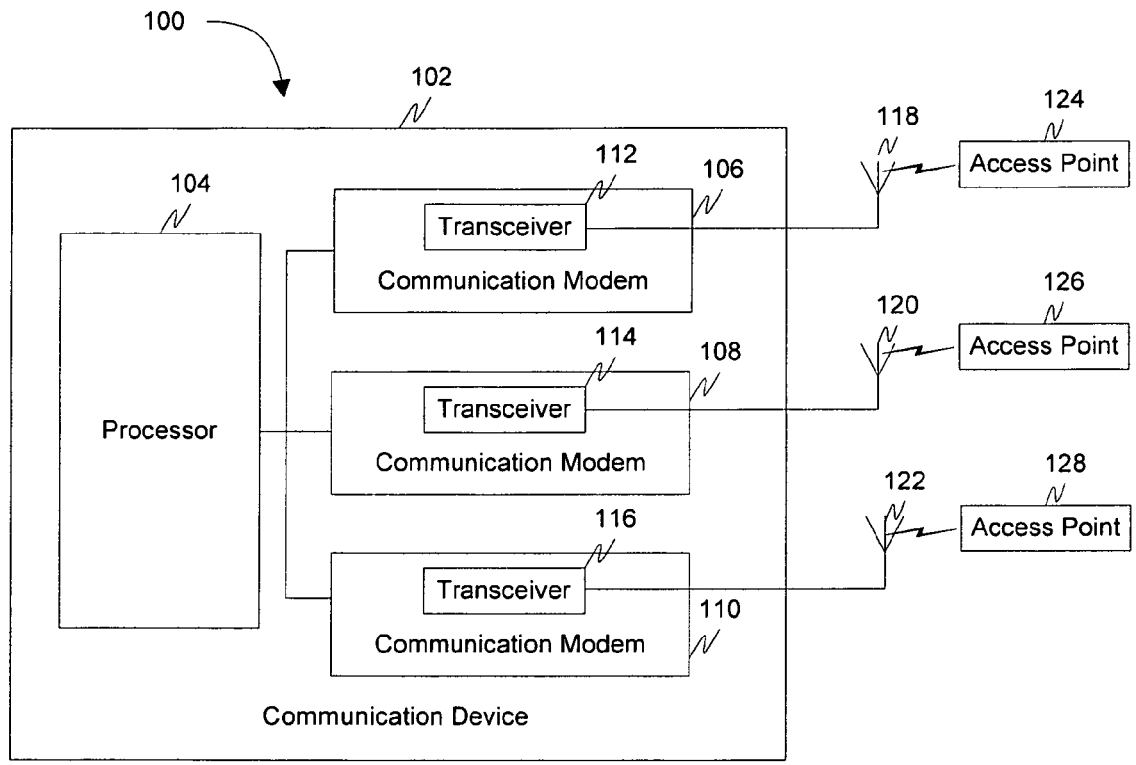
FIG. 1 is a block diagram showing an environment (that is exemplary) in which various embodiments of the invention can function.

Before describing in detail embodiments that are in accordance with the invention, it should be observed that the embodiments reside primarily in combinations of method steps and apparatus components related to a method and apparatus for coexistence of plurality of communication technologies in communication device.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

Various embodiments of the invention provide methods, apparatuses, and systems for enabling coexistence of a plurality of communication technologies in a communication device. The plurality of communication technologies include one or more of a Bluetooth, a Worldwide Interoperability Microwave Access (WiMAX), a Wireless Metropolitan Area Network (WMAN), and a Wireless Local Area Network (WLAN). The method includes determining a time offset between a first communication event of a first communication technology of the plurality of communication technologies and a second communication event of a second communication technology of the plurality of communication technologies. The method further includes altering a first communication state of one or more of the first communication technology and the second communication technology to a second communication state based on one or more of the time offset and a plurality of parameters of one or more of the first communication technology and the second communication technology.

In an embodiment, the method includes determining one or more of a DownLink (DL) information and an UpLink (UL) information of a first communication technology of the plurality of communication technologies. The method further includes setting a time offset between a first communication event of the first communication technology of the plurality of communication technologies and a second communication event of a second communication technology of the plurality of communication technologies based on one or more of the DL information, the UL information, and a plurality of parameters.

FIG. 1 is a block diagram showing an environment 100 (that is exemplary) in which various embodiments of the invention may function. Environment 100 includes a communication device 102. Examples of communication device 102 may include, but are not limited to a Personal Digital Assistant (PDA), a mobile phone, a laptop, a Customer Premises Equipment (CPE), and a personal computer. Communication device 102 includes a processor 104 and one or more communication modems (for example, a communication modem 106, a communication modem 108, and a communication modem 110). Processor 104 is operatively coupled to the one or more communication modems. Further, each of the one or more communication modems uses different communication technologies. Examples of the communication technologies may include, but are not limited to a Worldwide Interoperability for Microwave Access (WiMAX), a Wireless Metropolitan Area Network (WMAN), a Bluetooth, and a Wireless Local Area Network (WLAN). For example, communication modem 106 may be a WiMAX modem that operates in Radio Frequency (RF) spectrum of 2.3 GHz-2.4 GHz, 2.5 GHz-2.7 GHz, and 3.3 GHz-3.8 GHz, communication modem 108 may be a Bluetooth modem that operates in a RF spectrum of 2.4 GHz, and communication modem 110 may be a WLAN modem that operates in a RF spectrum of 2.4 GHz-2.5 GHz and 5 GHz.

Each of the one or more communication modems are also connected with each other through one or more connections and exchange information over the one or more connections. Examples of the information may include but are not limited to, a priority of current or planned operations, a state of current or planned operations, a duration of current or planned operations, a DL sub-frame timing, an UL sub-frame timing, a beacon period timing, a request for operation, a grant for operation, a modem activity indication, an enhanced Synchronous Connection Oriented (eSCO) reserved slot timing indication, a eSCO retransmission slot timing indication, an enhanced SCO retransmission Window (WeSCO) interval timing indication, an enhanced Synchronous Connection Oriented periodicity (TeSCO) interval timing indication, a Synchronous Connection Oriented (SCO) slots timing indication, a Synchronous Connection Oriented periodicity (TSCO) interval timing indication, a Transmission (Tx) slot timing indication, a Reception (Rx) slot timing indication.

Each of the one or more communication modems includes one or more transceivers. For example, communication modem 106 includes a transceiver 112, communication modem 108 includes a transceiver 114, and communication modem 110 includes a transceiver 116. Further, each of the one or more transceivers includes one or more antennas. For example, transceiver 112 includes an antenna 118, transceiver 114 includes an antenna 120, and transceiver 116 includes an antenna 122. The one or more communication modems communicate with one or more access points using the one or more antennas of the one or more transceivers. For example, communication modem 106 communicates with an access point 124 using antenna 118, communication modem 108 communicates with an access point 126 using antenna 120, and communication modem 110 communicates with an access point 128 using antenna 122. An access point of the one or more access points may be one of a WiMAX Base Station (BS), a WLAN access point, and a Bluetooth peer based on a communication technology used by a communication modem of the one or more communication modems communicating with the access point.

Figure 2:
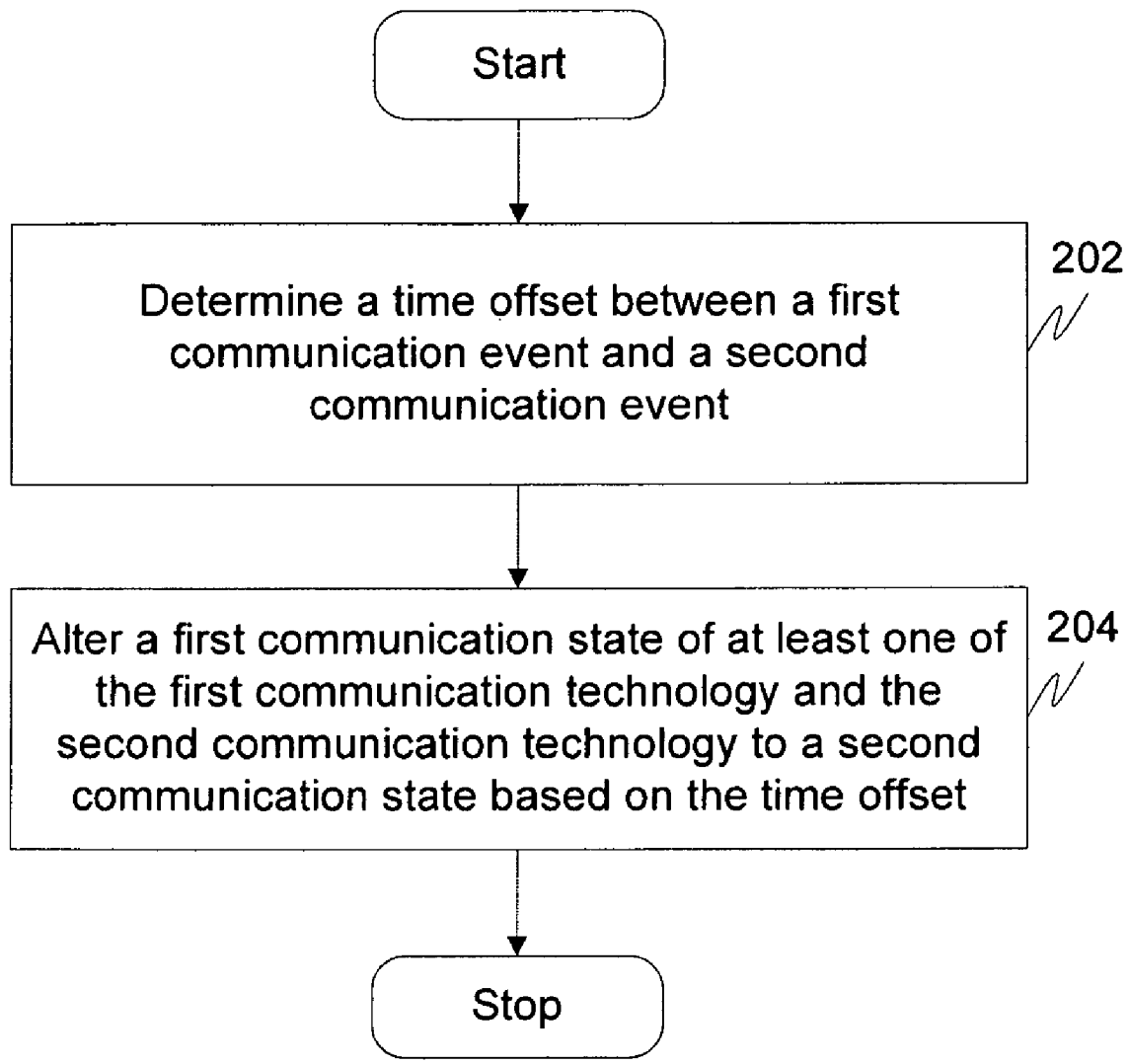
FIG. 2 is a flowchart of a method for coexistence of a plurality of communication technologies in a communication device, in accordance with an embodiment of the invention.

FIG. 2 is a flowchart of a method for coexistence of a plurality of communication technologies in a communication device, in accordance with an embodiment of the invention. Examples of the plurality of communication technologies may include, but are not limited to a WiMAX, a WMAN, a WLAN, and a Bluetooth. At step 202, a time offset is determined between a first communication event and a second communication event in the communication device. The time offset is determined periodically. The first communication event is of a first communication technology of the plurality of communication technologies. Similarly, the second communication event is of a second communication technology of the plurality of communication technologies. The first communication event may be one of a DL sub-frame and an UL sub-frame, if the first communication technology is WiMAX. Additionally, the second communication event may be one of a SCO slot, an eSCO reserved slot, an eSCO retransmission slot, an eSCO slot pair, a SCO slot pair, a WeSCO interval, a TeSCO interval, and a TSCO interval, if the second communication technology is Bluetooth. In this case, the time offset is computed between a WiMAX communication event and a Bluetooth communication event. For example, the time offset may be determined between a DL sub-frame and an eSCO reserved slot.

The time offset is determined between one of beginning and end of the first communication event and one of beginning and end of the second communication event. For example, time offset is determined between beginning of a DL sub-frame (a WiMAX communication event) and beginning of an eSCO reserved slot (a Bluetooth communication event).

The time offset is determined based on one or more signals of one or more of the first communication technology and the second communication technology. For example, time offset between a WiMAX communication event and a Bluetooth communication event is determined based on a timing signal, such as, a BT_PRIORITY signal and a BT_STATE signal, a WiMAX DL sub-frame timing signal, and a WiMAX UL sub-frame timing signal. Alternatively, the time offset may be determined based on a plurality of parameters. Examples of a parameter may include, but are not limited to a TSCO interval, a TeSCO interval, duration of a DL sub-frame, duration of an UL sub-frame, a WeSCO interval, and a bandwidth. This is further explained in detail in conjunction with FIG. 3. One or more parameters of the plurality of parameters is determined based on one or more signals of one or more of the first communication technology and the second communication technology. The plurality of parameters may be determined periodically. Alternatively, one or more parameter of the plurality of parameters may be predefined. The one or more parameter may be communicated between the first communication technology and the second communication technology in one or more messages.

After the time offset is determined, a first communication state of one or more of the first communication technology and the second communication technology is altered to a second communication state at step 204. The first communication state is altered based on one or more of the time offset and the plurality of parameters. The first communication state is altered periodically. The second communication state may be retrieved from a database based on one or more of the time offset and the plurality of parameters. Alternatively, the second communication state may be determined at run-time. This is further explained in detail in conjunction with FIG. 3. The second communication state is a sequence of one or more of an availability period and an unavailability period. The availability period of a communication technology is the period used by the communication technology for transmission or reception over its air interface. The availability period may be a listening window and the unavailability period may be a sleep window, if one of the first communication technology and the second communication technology is WiMAX. For example, based on the time offset between a WiMAX communication event and a Bluetooth communication event, the communication state of WiMAX is altered to an alternating sequence of sleep window of two frames and listening window of one frame. This is further explained in detail in conjunction with FIG. 6. As a result of altering the first communication state, one or more availability periods of the first communication technology and the second communication technology do not interfere.

The above mentioned method enables coexistence of the plurality of communication technologies on the communication device. The method minimizes interference between the plurality of communication technologies. Moreover, the method may be implemented without the need to change the actual architecture of one or more of the plurality of communication technologies. Additionally, the method solves the problem created due to clock-drift in the plurality of communication technologies by periodically determining the time offset.

Figure 3:
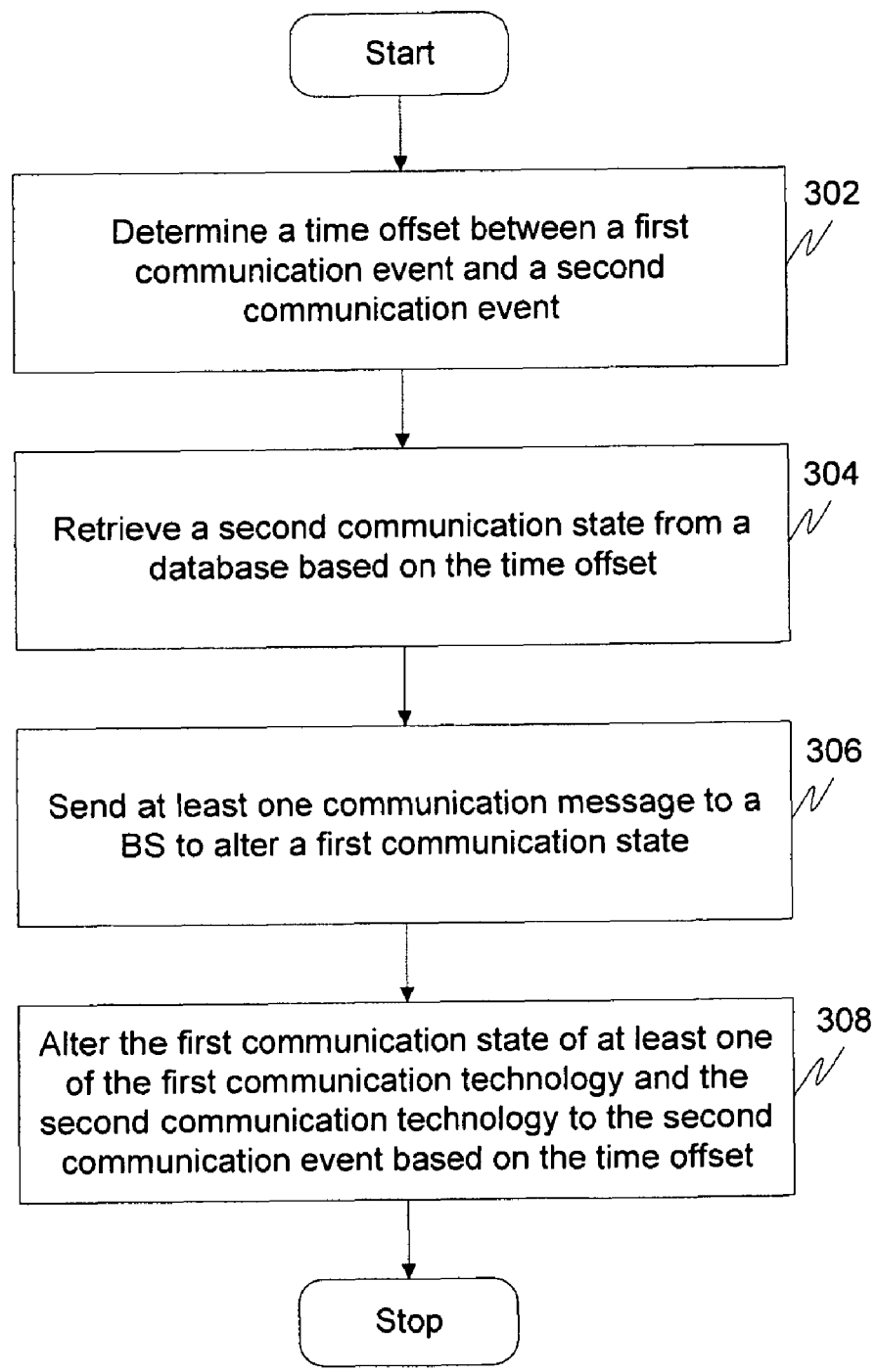
FIG. 3 is a flowchart for a method for coexistence of a plurality of communication technologies in a communication device, in accordance with another embodiment of the invention.

FIG. 3 is a flowchart for a method for coexistence of a plurality of communication technologies in a communication device, in accordance with another embodiment of the invention. At step 302, a time offset is determined between a first communication event and a second communication event in the communication device. The first communication event is of a first communication technology of the plurality of communication technologies. Similarly, the second communication event is of a second communication technology of the plurality of communication technologies. This has been explained in detail in conjunction with FIG. 2.

Thereafter at step 304, a second communication state is retrieved from a database based on one or more of the time offset and a plurality of parameters. The database may be located in the communication device. Alternatively, the database may be located in any other network entity. Examples of the network entity may include, but are not limited to a WiMAX BS, a WLAN access point, and a Bluetooth peer. The database may include one or more communication states corresponding to one or more of a time offset and a plurality of parameters. Examples of a parameter may include, but are not limited to a TSCO interval, a TeSCO interval, duration of a DL sub-frame, duration of an UL sub-frame, a WeSCO interval, and a bandwidth. For example, time offset of 4.375 ms is determined between beginning of a DL sub-frame (a WiMAX communication event), and beginning of an eSCO reserved slot (a Bluetooth communication event) using one or more of a DL sub-frame timing signal, a BT_PRIORITY signal, and an eSCO slot timing signal. Thereafter, the values of the time offset and the plurality of parameters are used to retrieve a communication state for WiMAX from a database. The communication state of WiMAX that correspond to the values in the database may be an alternating sequence of sleep window of two frames and listening window of one frame. This is further explained in detail in conjunction with FIG. 6.

At step 306, the communication device sends one or more communication messages to a BS after retrieving the second communication state from the database. The one or more communication messages are sent to alter a first communication state of one or more of the first communication technology and the second communication technology to the second communication state retrieved from the database. A communication message of the one or more communication messages may include information for one or more of a listening window, a sleep window, and a start frame number, if one of the first communication technology and the second communication technology is WiMAX. The information for the listening window and the sleep window may be the size of the listening window and the size of the sleep window. The first communication state may be altered at the beginning of a frame, which has its frame number equal to the start frame number. Referring to the above example, the communication device sends a communication message that indicates size of listening window as one frame and size of sleep window as two frames to the BS.

At step 308, the first communication state of one or more of the first communication technology and the second communication technology is altered to the second communication state based on the one or more communication messages sent to the BS. The first communication state is altered after the BS acknowledges the second communication state. The first communication state is altered based on one or more of the time offset and the plurality of parameters of one or more of the first communication technology and the second communication technology. This has been explained in detail in conjunction with FIG. 2.

Figure 4:
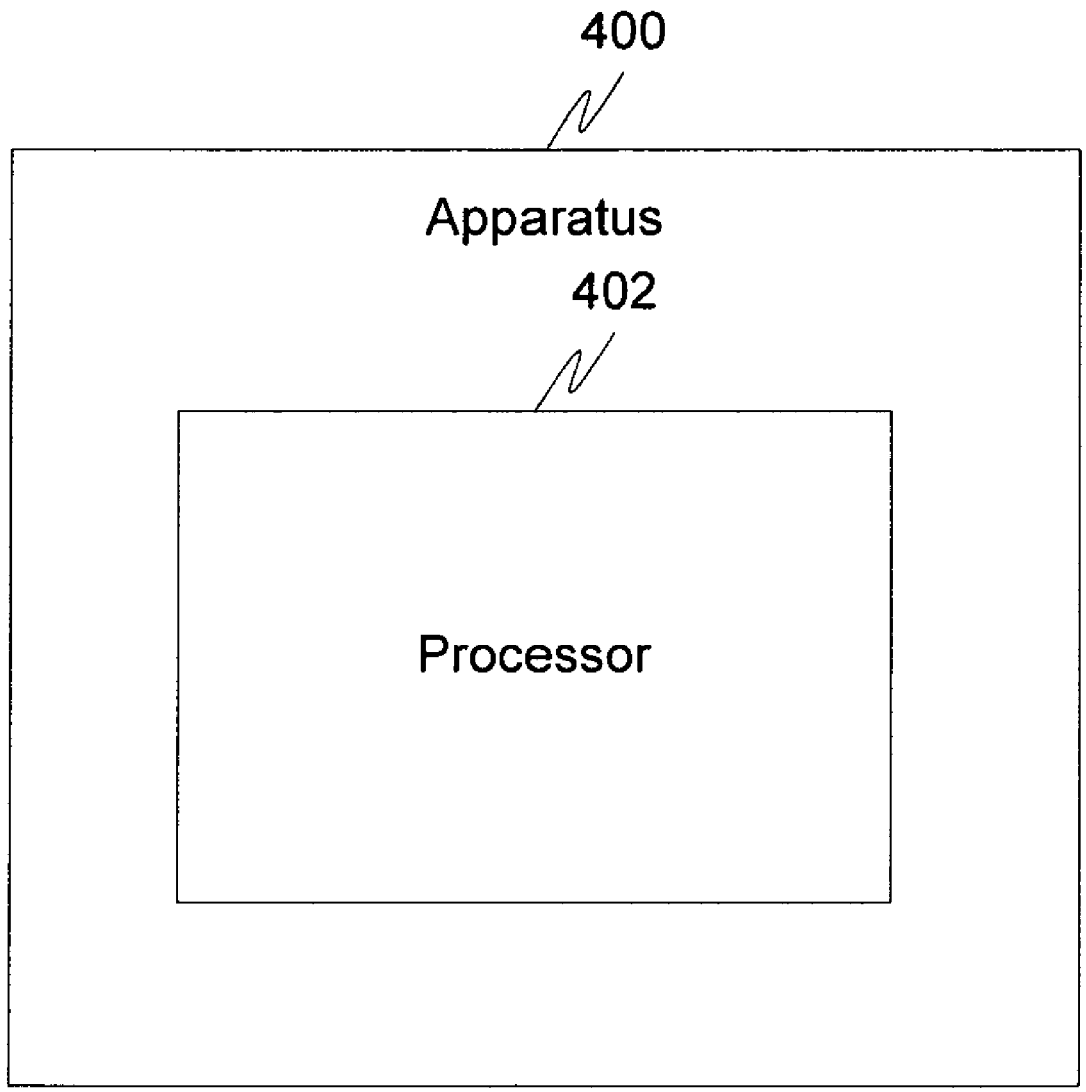
FIG. 4 is a block diagram showing an apparatus for enabling coexistence of a plurality of communication technologies, in accordance with an embodiment of the invention.

FIG. 4 is a block diagram showing an apparatus 400 for enabling coexistence of a plurality of communication technologies, in accordance with an embodiment of the invention. Apparatus 400 supports the plurality of communication technologies. Apparatus 400 may be a communication device. Examples of the communication device may include, but are not limited to a PDA, a mobile radio, a mobile telephone, a CPE, and a mobile computer. Apparatus 400 communicates with a BS for transmitting and receiving communication information. This has been explained in detail in conjunction with FIG. 2.

Apparatus 400 includes a processor 402. Examples of processor 402 may include, but are not limited to a Central Processing Unit (CPU), a microprocessor, a controller, and a Digital Signal Processor (DSP). Processor 402 determines a time offset between a first communication event and a second communication event. The first communication event is of a first communication technology of the plurality of communication technologies. Similarly, the second communication event is of the second communication technology of the plurality of communication technologies.

Based on the time offset, processor 402 alters a first communication state of one or more of the first communication technology and the second communication technology to a second communication state. The first communication state is altered based on one or more of the time offset and a plurality of parameters of one or more of the first communication technology and the second communication technology. This has been explained in detail in conjunction with FIG. 2.

To alter the first communication state, processor 402 retrieves the second communication state from a database based on one or more of the time offset and the plurality of parameters. This has been explained in detail in conjunction with FIG. 3. Alternatively, processor 402 may send one or more communication messages to the BS to alter the first communication state of one or more of the first communication technology and the second communication technology. In response to receiving the communication message, the BS alters the first communication state of one or more of the first communication technology and the second communication technology to the second communication state. The one or more communication messages include information of one or more of a listening window, a sleep window, and a start frame number, if one of the first communication technology and the second communication technology is WiMAX. The first communication state may be altered at the beginning of a frame, which has its frame number equal to the start frame number.

Figure 5:
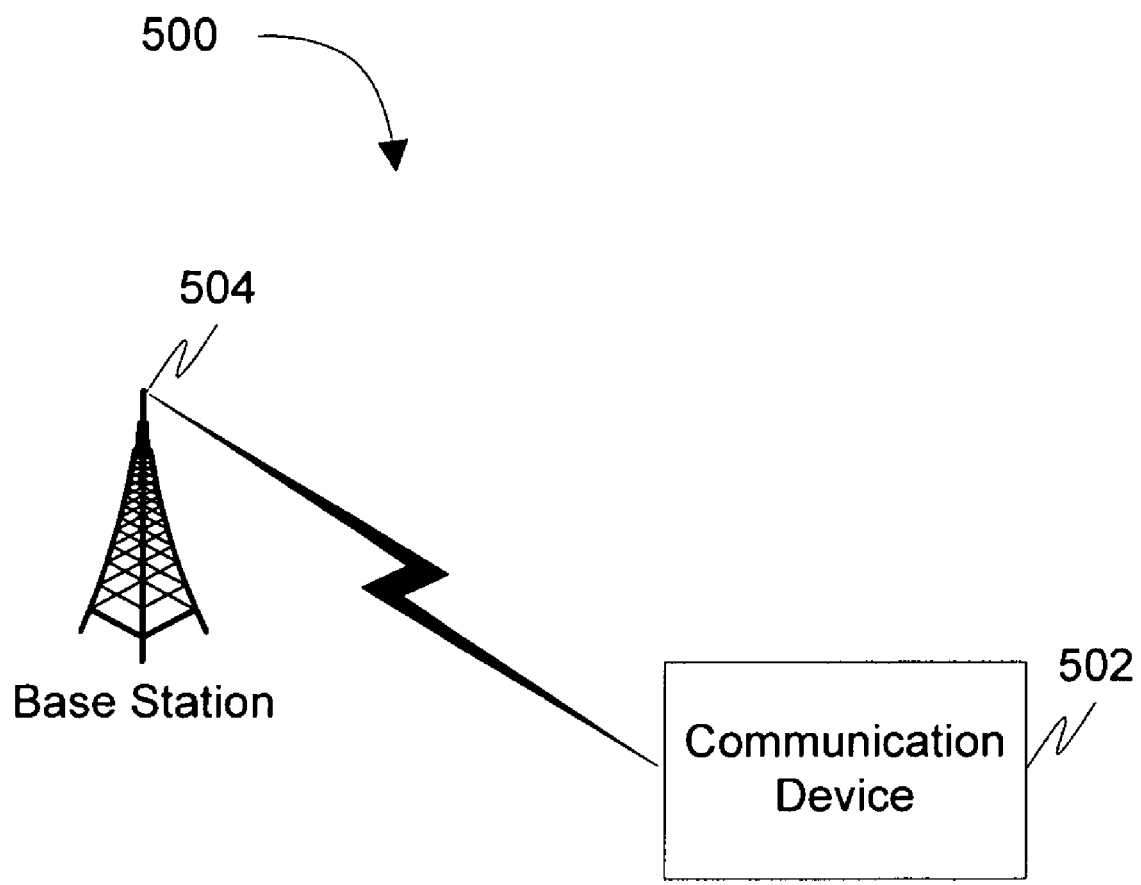
FIG. 5 is a block diagram showing a system for enabling coexistence of a plurality of communication technologies, in accordance with an embodiment of the invention.

FIG. 5 is a block diagram showing a system 500 for enabling coexistence of a plurality of communication technologies, in accordance with an embodiment of the invention. System 500 includes a communication device 502 and a BS 504 operatively coupled with communication device 502. Examples of communication device 502 may include, but are not limited to a PDA, a mobile radio, a mobile telephone, a CPE, and a mobile computer.

Communication device 502 determines a time offset between a first communication event and a second communication event. The first communication event is of a first communication technology of the plurality of communication technologies. Similarly, the second communication event is of the second communication technology of the plurality of communication technologies. Thereafter, communication device 502 sends information of the time offset to BS 504.

Based on the time offset, BS 504 alters a first communication state of one or more of the first communication technology and the second communication technology to a second communication state. The first communication state is altered based on one or more of the time offset and a plurality of parameters of one or more of the first communication technology and the second communication technology. This has been explained in detail in conjunction with FIG. 2. To alter the first communication state, BS 504 retrieves the second communication state from a database based on one or more of the time offset and the plurality of parameters. This has been explained in detail in conjunction with FIG. 3.

Figure 6:
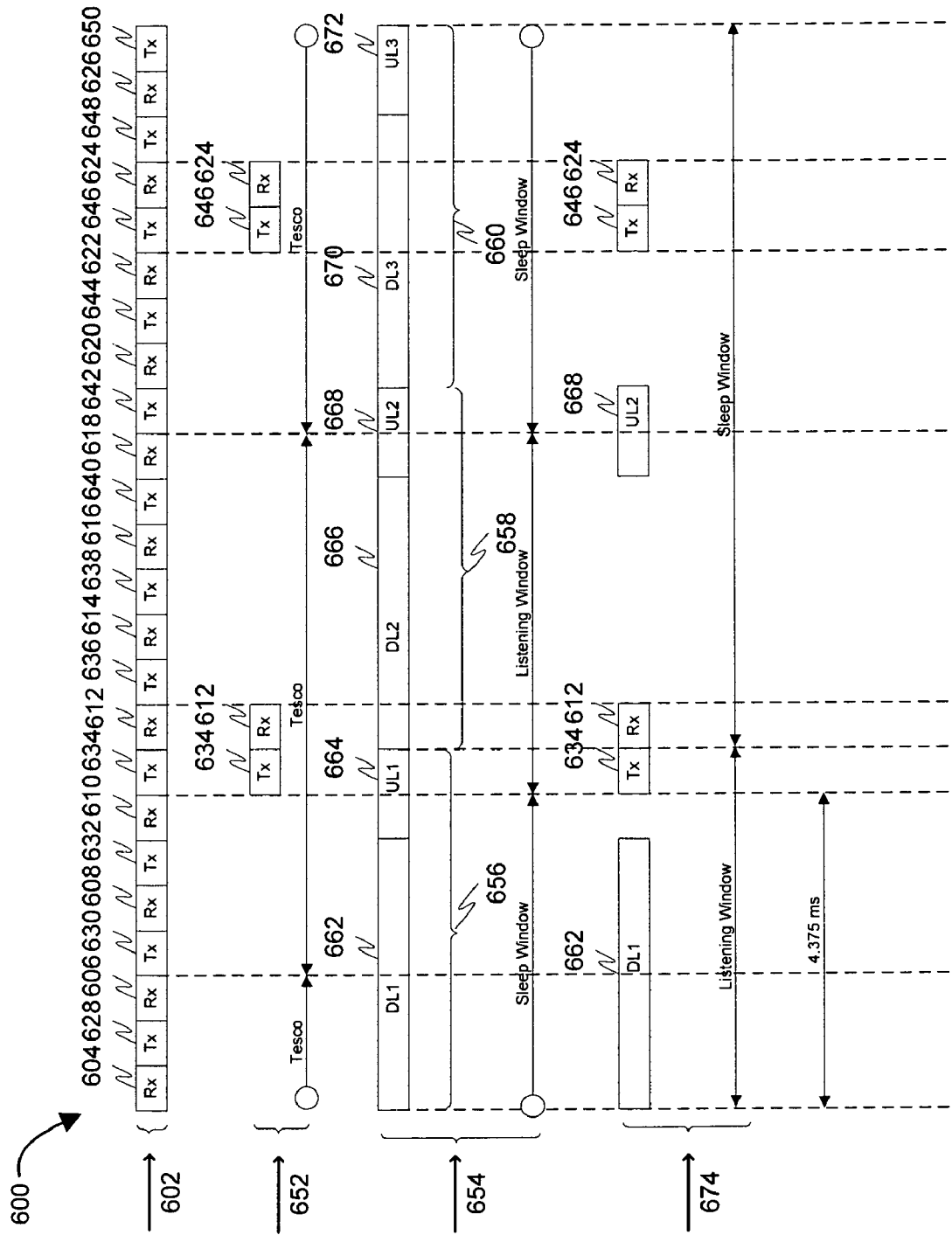
FIG. 6 is illustrates a timing diagram showing coexistence of Bluetooth and WiMAX in a communication device, in accordance with an exemplary embodiment of the invention.

FIG. 6 illustrates a timing diagram 600 showing coexistence of Bluetooth and WiMAX in a communication device, in accordance with an exemplary embodiment of the invention. A Bluetooth slot timing structure 602 illustrates 24 slots used by Bluetooth for communication. Each of these 24 slots is 0.625 ms long. These 24 slots include 12 reception slots and 12 transmission slots. These 12 reception slots include a slot 604, a slot 606, a slot 608, a slot 610, a slot 612, a slot 614, a slot 616, a slot 618, a slot 620, a slot 622, a slot 624, and a slot 626. Similarly, the 12 transmission slots include a slot 628, a slot 630, a slot 632, a slot 634, a slot 636, a slot 638, a slot 640, a slot 642, a slot 644, a slot 646, a slot 648, and a slot 650.

The TeSCO interval for Bluetooth slot timing structure 602 includes 12 slots and WeSCO interval for Bluetooth slot timing structure 602 is zero. Therefore, Bluetooth slot timing structure 602 includes two TeSCO intervals. For every 12 contiguous slots, each TeSCO interval includes two contiguous slots for transmission and reception. Two contiguous slots form an eSCO slot pair. eSCO slot pairs in Bluetooth slot timing structure 602 are illustrated in a Bluetooth eSCO slot timing structure 652. As shown, in Bluetooth eSCO slot timing structure 652, slot 634 and slot 612 form a first eSCO slot pair and slot 646 and slot 624 form a second eSCO slot pair. Each of the first eSCO slot pair and the second eSCO slot pair form a Bluetooth communication event. The sequence of Bluetooth slot timing structure 602 repeats periodically with a period of 24 Bluetooth slots. Similarly, the sequence of Bluetooth eSCO slot timing structure 652 repeats periodically with period of 24 Bluetooth slots. FIG. 6 illustrates a set of 24 Bluetooth slots.

Similarly, a WiMAX frame timing structure 654, which is a first communication state, illustrates three contiguous frames of WiMAX: a frame 656, a frame 658, and a frame 660. Each of the three frames includes an UL sub-frame for communicating UL information and a DL sub-frame for communicating DL information. The duration for a DL sub-frame is approximately 3.5 ms and for an UL sub-frame is approximately 1.2 ms. In WiMAX frame timing structure 654, frame 656 includes a DL sub-frame 662 (DL1) and an UL sub-frame 664 (UL1), frame 658 includes a DL sub-frame 666 (DL2) and an UL sub-frame 668 (UL2), and frame 660 includes a DL sub-frame 670 (DL3) and an UL sub-frame 672 (UL3). The sequence of WiMAX frame timing structure 654 repeats periodically with a period of three WiMAX frames. FIG. 6 illustrates a set of three WiMAX frames. The period of three WiMAX frames is same as the period of 24 Bluetooth slots. Moreover, relative time offset between WiMAX frame timing structure 654 and Bluetooth eSCO slot timing structure 652 remains same in every repeating period.

DL sub-frame 662 and UL sub-frame 668 forms a relevant pair of sub-frames since DL sub-frame 662 carries burst allocation information for allocations in sub-frame 668. WiMAX has to receive DL sub-frame 662 to use UL sub-frame 668. Similarly, DL sub-frame 666 and UL sub-frame 672 form a relevant pair of sub-frames and DL sub-frame 670 and UL sub-frame 664 form a relevant pair of sub-frames.

WiMAX uses a sleep mode supporting co-located co-existence with MAP relevance for co-located coexistence Power Saving Class (PSC) bit set to one, sleep window set to two frames, and listening window set to one frame. In WiMAX frame timing structure 654, frame 658 is part of a listening window and frame 660 and frame 656 are part of a sleep window. Additionally, in WiMAX frame timing structure 654, the relative start frame number of a first frame (i.e. frame 660) in the sleep window is two, as the beginning of the sleep window is after two frames (i.e., frame 656 and 658). The start frame number is frame number of frame 656 plus relative start frame number plus non negative integer multiple of sum of the sleep window and the listening window. For example, if frame number of frame 656 is 700, then start frame number may be any of 701, 704, 707, 710, and 713.

In the sleep mode supporting co-located co-existence with MAP relevance for co-located coexistence PSC bit set to one, for communication, WiMAX uses all DL sub-frames in a listen window and does not use a DL sub-frame in a sleep window. Moreover in such case, WiMAX uses a first UL sub-frame of a first frame of a sleep window and does not use any other UL sub-frame in the sleep window. Also, WiMAX does not use a first UL sub-frame of a first frame of a listen window and uses all other UL sub-frames of the listen window for its communication. Therefore, in WiMAX frame timing structure 654, the communication device uses DL sub-frame 666 and UL sub-frame 672 for communication. The communication device does not use UL sub-frame 664, DL sub-frame 662, DL sub-frame 670, and UL sub-frame 668 for its communication. Each of DL sub-frame 666, DL sub-frame 670, and DL sub-frame 662 form a WiMAX communication event.

Based on the information about Bluetooth eSCO slot timing structure 652 and WiMAX frame timing structure 654, processor 402 determines a time offset between beginning of DL sub-frame 662 and beginning of slot 634. The time offset is determined as 4.375 ms.

Thereafter, based on the time offset of 4.375 ms, the TeSCO interval of 12, the WeSCO interval of zero, duration of DL sub-frame of 3.5 ms, duration of UL sub-frame of 1.2 ms, and WiMAX bandwidth of 10 MHz, processor 402 finds out that slot 634 and slot 612 interfere with UL sub-frame 664 and DL sub-frame 666 and slot 646 and slot 624 interfere with DL sub-frame 670. To avoid this interference, processor 402 sends a communication message to a BS to alter communication state of WiMAX frame timing structure 654. For this, processor 402 suggests the BS to alter the first communication state to a second communication state, which is a sequence of a sleep window of two frames, i.e., frame 658 and frame 660 and a listening window of one frame, i.e., frame 656. The relative start frame number for the sequence is one, as the beginning of first frame (i.e., frame 658) of the sleep window is after one frame (i.e., frame 656). This is depicted in a Bluetooth-WiMAX time sharing structure 674. Therefore, in Bluetooth-WiMAX time sharing structure 674, slot 634, slot 612, slot 646, and slot 624 are used for Bluetooth communication and DL sub-frame 662 and UL sub-frame 668 are used for WiMAX communication. Processor 402 finds the time offset periodically.

Figure 7:
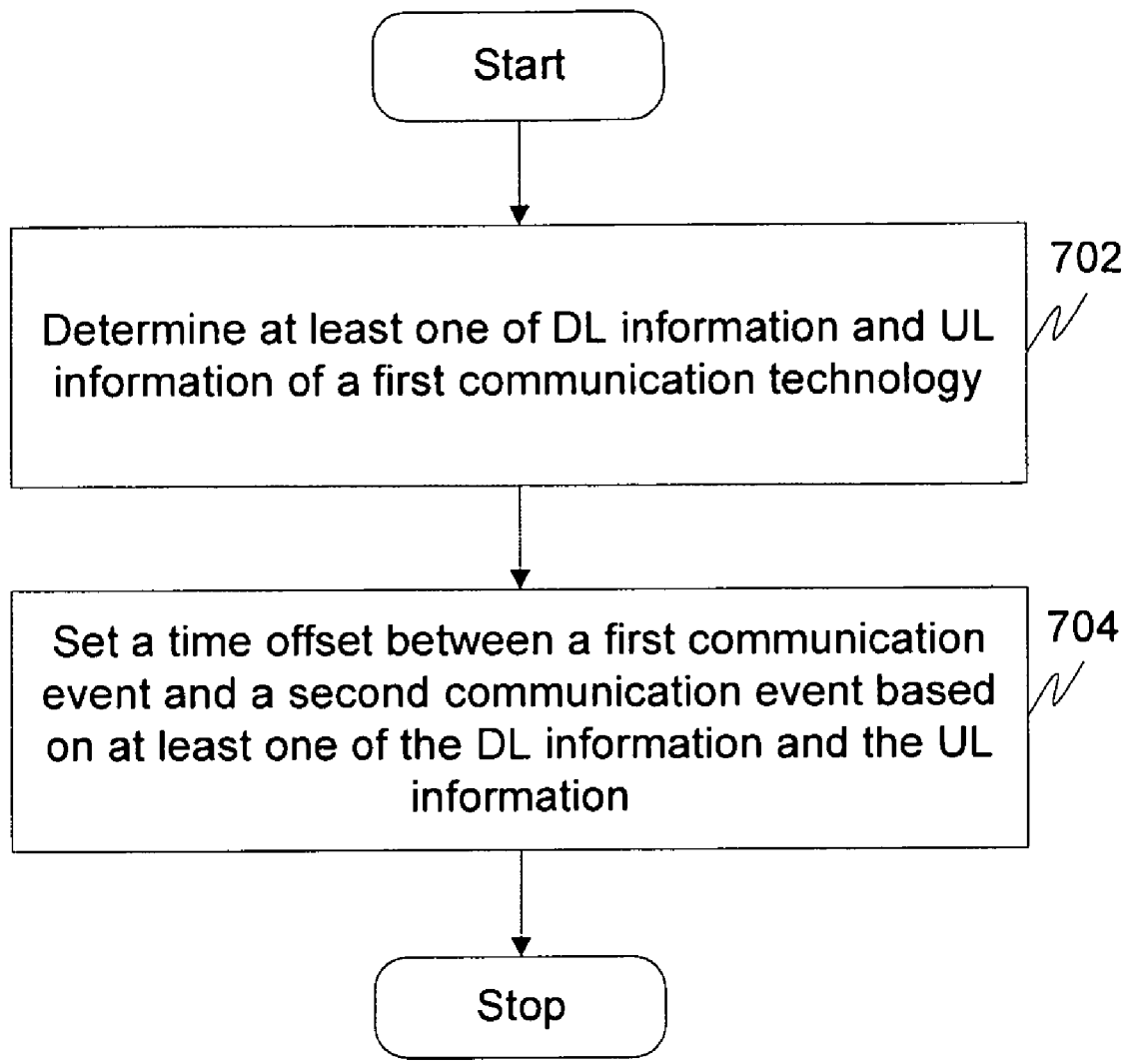
FIG. 7 is a flowchart of a method of coexistence of a plurality of communication technologies in a communication device, in accordance with another embodiment of the invention.

FIG. 7 is a flowchart of a method of coexistence of a plurality of communication technologies in a communication device, in accordance with another embodiment of the invention. The plurality of communication technologies have synchronized clocks. Examples of the plurality of communication technologies may include, but are not limited to a WiMAX, a WMAN, a WLAN, and a Bluetooth. At step 702, one or more of DL information, and UL information of a first communication technology of the plurality of communication technologies is determined. If the first communication technology is WiMAX, the DL information may be duration of a DL sub-frame and the UL information may be duration of an UL sub-frame.

Based on one or more of the DL information, the UL information, and a plurality of parameters, a time offset is set between a first communication event of the first communication technology of the plurality of communication technologies and a second communication event of a second communication technology of the plurality of communication technologies at step 704. Examples of a parameter may include, but are not limited to a TSCO interval, a TeSCO interval, duration of a DL sub-frame, duration of an UL sub-frame, a WeSCO interval, and a bandwidth. The first communication event may be one of a DL sub-frame and an UL sub-frame, if the first communication technology is WiMAX. Additionally, the second communication event may be one of, a transmission slot, a reception slot, if the second communication technology is Bluetooth. The time offset may be retrieved from a database based on one or more of the DL information, the UL information, and the plurality of parameters. This is further explained in detail in conjunction with FIG. 8.

Thereafter, the time offset may be set between one of beginning and end of the first communication event and one of beginning and end of the second communication event. For example, the time offset may be set between beginning of a DL sub-frame of WiMAX and end of a TeSCO interval of Bluetooth. Alternatively, the time offset may be set between end of a DL sub-frame and beginning of a transmission slot. For example, if duration of a DL sub-frame is greater than or equal 3.302 ms, the time offset retrieved from the database may be 0.450 ms. In this case, the time offset of 0.450 ms is set between start of a DL sub-frame and start of a Bluetooth transmission slot. However, if duration of a DL sub-frame is less than 3.302 ms, the time offset retrieved from the database may be 0.010 ms. In this case, the time offset of 0.010 ms is set between end of a DL sub-frame and start of a Bluetooth transmission slot. As a result, interference between at least one of the SCO slot pair and one or more of a DL sub-frame and an UL sub-frame used for transmission or reception is minimized. This is further explained in detail in conjunction with FIG. 8.

Figure 8:
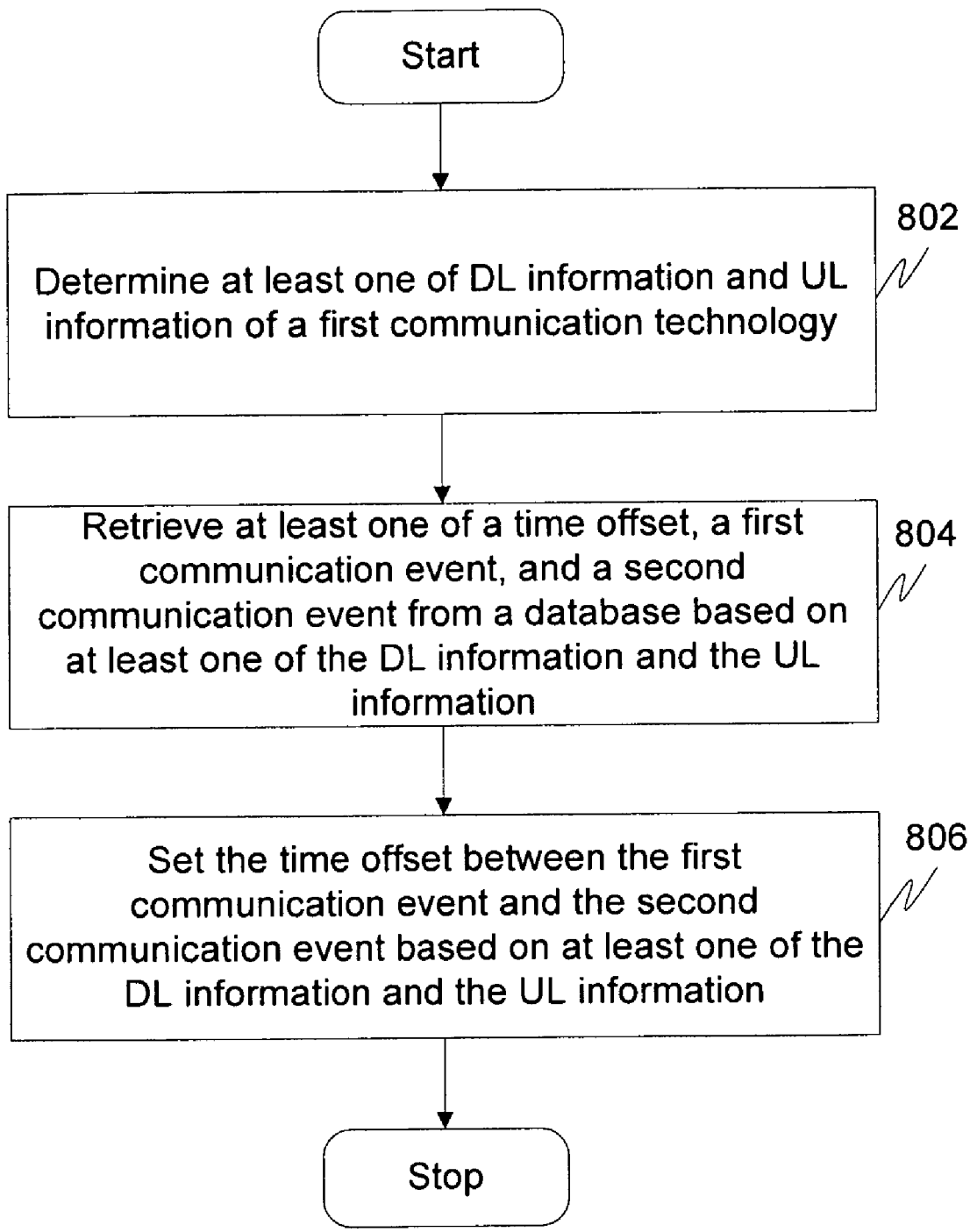
FIG. 8 is a flow chart of a method of coexistence of a plurality of communication technologies in a communication device, in accordance with another embodiment of the invention.

FIG. 8 is a flow chart of a method of coexistence of a plurality of communication technologies in a communication device, in accordance with another embodiment of the invention. The plurality of communication technologies have synchronized clocks. At step 802, one or more of DL information and UL information of a first communication technology of the plurality of communication technologies is determined. This has been explained in detail in conjunction with FIG. 7.

Based on one or more of the DL information, the UL information, and a plurality of parameters, one or more of a time offset, a first communication event, and a second communication event is retrieved from a database at step 804. The time offset is between the first communication event of the first communication technology and the second communication event of a second communication technology of the plurality of communication technologies. The first communication event may be one of a DL sub-frame and an UL sub-frame. Additionally, the second communication event may be one of a transmission slot and a reception slot, if the second communication technology is Bluetooth. Examples of a parameter may include, but are not limited to a TSCO interval, a TeSCO interval, duration of a DL sub-frame, duration of an UL sub-frame, a WeSCO interval, and a bandwidth. This is has been explained in detail in conjunction with FIG. 7

The database may be located in the communication device. Alternatively, the database may be located in any other network entity. Examples of the network entity may include, but are not limited to a BS and a gateway. The database may include one or more time offsets corresponding to values of one or more of the DL information, the UL information, and the plurality of parameters. For example, for WiMAX, duration of a DL sub-frame is determined as 2.9 ms and duration of an UL sub-frame is determined as 1.8 ms. Based on duration of the DL sub-frame of 2.9 ms, duration of the UL sub-frame of 1.8 ms, and a TSCO interval that includes six slots, a time offset between beginning of a DL sub-frame of WiMAX and a transmission slot of Bluetooth is retrieved from the database. The time offset representing the values in the database may be equal to 0.625 ms.

Thereafter at step 806, the time offset is set between the first communication event and the second communication event. The time offset is set based on one or more of the DL information, the UL information, and the plurality of parameters. This has been explained in detail in conjunction with FIG. 7.

Figure 9:
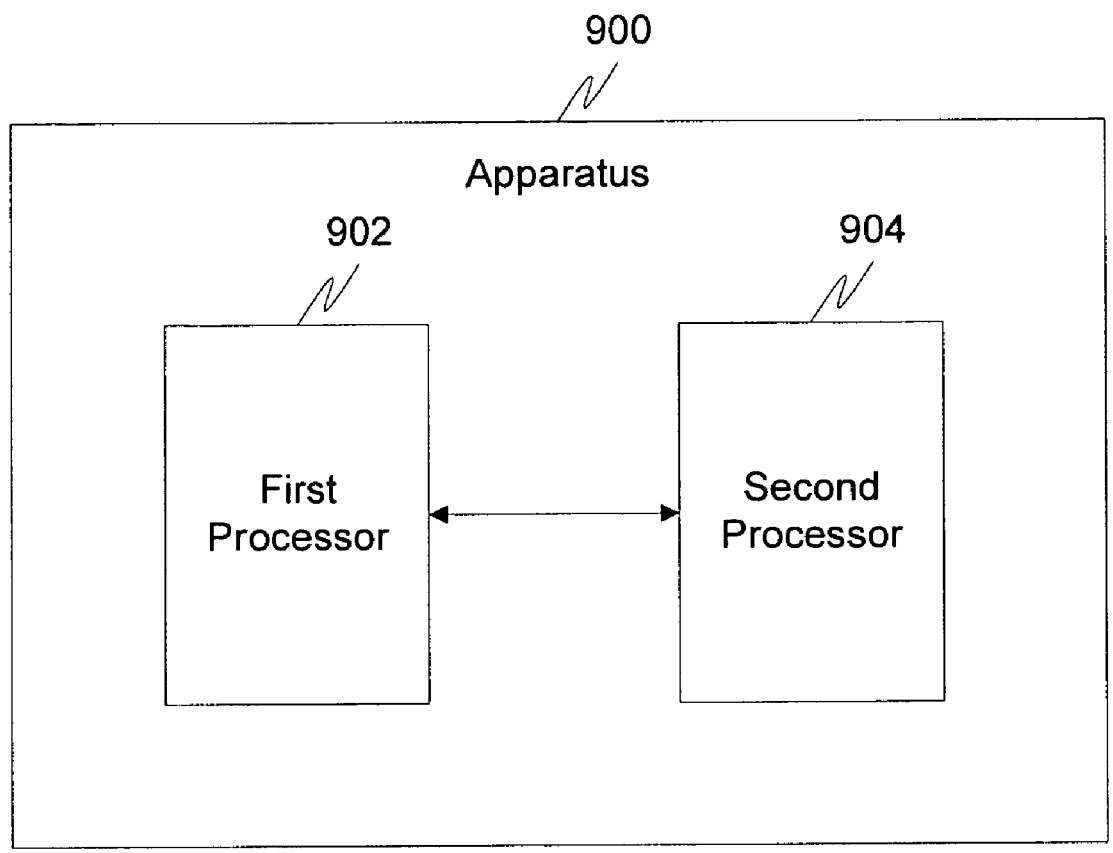
FIG. 9 is a block diagram showing an apparatus for enabling coexistence of a plurality of communication technologies in a communication device, in accordance with an embodiment of the invention.

FIG. 9 is a block diagram showing an apparatus 900 for enabling coexistence of a plurality of communication technologies in a communication device, in accordance with an embodiment of the invention. The plurality of communication technologies have synchronized clocks. Apparatus 900 supports the plurality of communication technologies. Apparatus 900 may be a communication device. Examples of the communication device may include, but are not limited to a PDA, a mobile radio, a mobile telephone, and a mobile computer. This has been explained in detail in conjunction with FIG. 2.

Apparatus 900 includes a first processor 902 and a second processor 904 operatively coupled with first processor 902. Examples of first processor 902 and second processor 904 may include, but are not limited to a Central Processing Unit (CPU), a microprocessor, a controller, and a Digital Signal Processor (DSP). First processor 902 determines one or more of DL information and UL information of a first communication technology of the plurality of communication technologies.

Second processor 904 may retrieve one or more of a time offset, a first communication event, and a second communication event from a database based on one or more of the DL information, the UL information, and a plurality of parameters. Based on one or more of the DL information, the UL information, and the plurality of parameters, second processor 904 sets a time offset between the first communication event of the first communication technology and the second communication event of a second communication technology of the plurality of communication technologies. This has been explained in detail in conjunction with FIG. 7.

Figure 10:
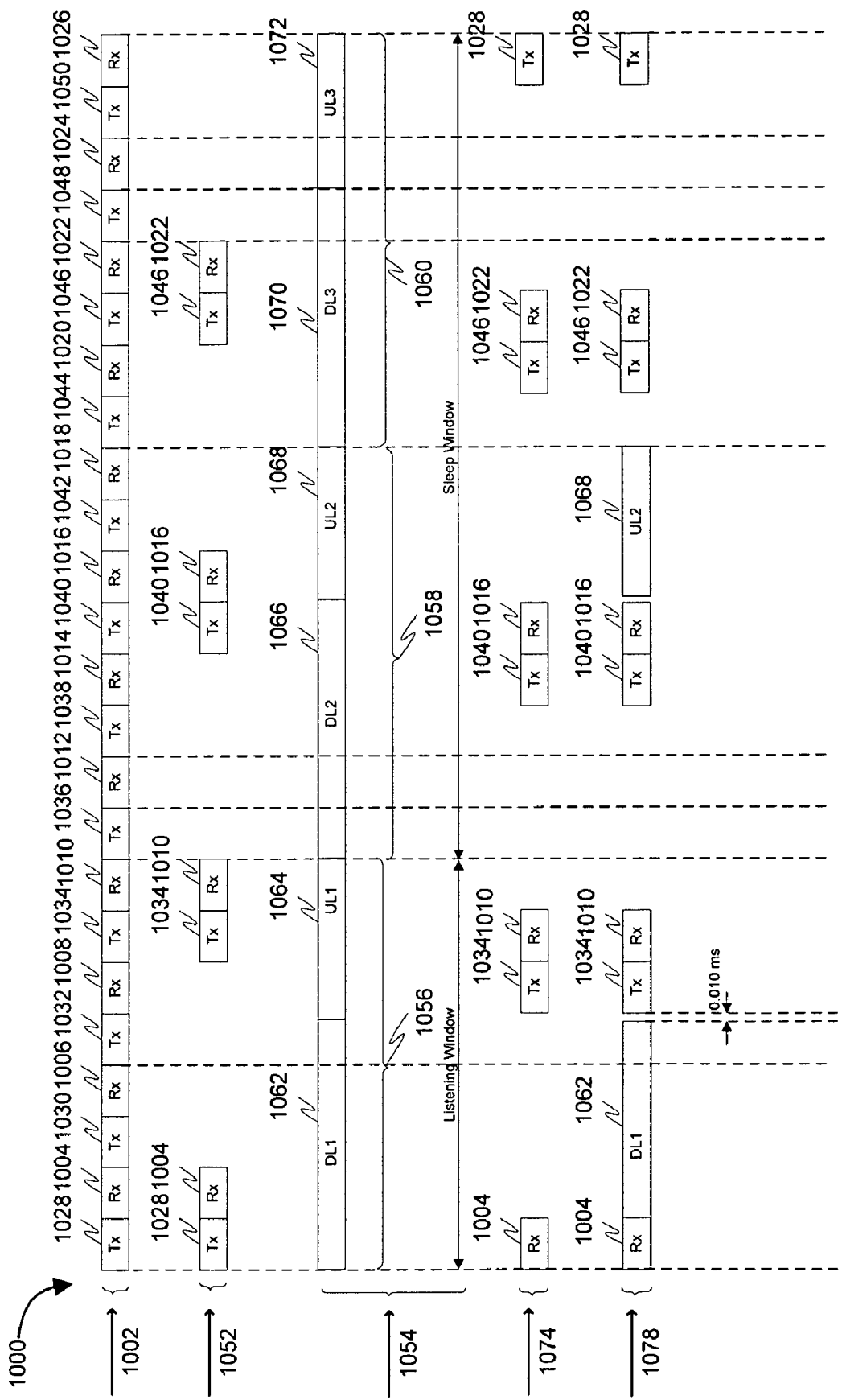
FIG. 10 illustrates a timing diagram showing coexistence of Bluetooth and WiMAX in a communication device, in accordance with another exemplary embodiment of the invention.

FIG. 10 illustrates a timing diagram 1000 showing coexistence of Bluetooth and WiMAX in a communication device, in accordance with another exemplary embodiment of the invention. Clocks of Bluetooth and WiMAX are synchronized so that clocks do not drift independently. Clock of Bluetooth (CLK) is set to native clock of Bluetooth (CLKN). The communication device is master of the Bluetooth link. A Bluetooth slot timing structure 1002 illustrates 24 slots used by Bluetooth for communication. Each of these 24 slots has a duration of 0.625 ms. These 24 slots include 12 reception slots and 12 transmission slots. These 12 reception slots include a slot 1004, a slot 1006, a slot 1008, a slot 1010, a slot 1012, a slot 1014, a slot 1016, a slot 1018, a slot 1020, a slot 1022, a slot 1024, and a slot 1026. Similarly, the 12 transmission slots include a slot 1028, a slot 1030, a slot 1032, a slot 1034, a slot 1036, a slot 1038, a slot 1040, a slot 1042, a slot 1044, a slot 1046, a slot 1048, and a slot 1050.

A TSCO interval for Bluetooth slot timing structure 1002 includes six slots. Therefore, Bluetooth slot timing structure 1002 includes four TSCO intervals. For every six contiguous slots, each TSCO interval includes two contiguous slots for transmission and reception assigned to the communication device. These two contiguous slots form a SCO slot pair. SCO slot pairs in Bluetooth slot timing structure 1002 are illustrated in a Bluetooth SCO slot timing structure 1052. As shown, in Bluetooth SCO slot timing structure 1052, slot 1028 and slot 1004 form a first SCO slot pair, slot 1034 and slot 1010 form a second SCO slot pair, slot 1040 and slot 1016 form a third SCO slot pair, and slot 1046 and slot 1022 form a fourth SCO slot pair. Bluetooth transmission slots and Bluetooth reception slots are communication events of Bluetooth. The sequence of Bluetooth slot timing structure 1002 repeats periodically with a period of 24 Bluetooth slots. Similarly, the sequence of Bluetooth SCO slot timing structure 1052 repeats periodically with period of 24 Bluetooth slots. FIG. 10 illustrates a set of 24 Bluetooth slots.

Similarly, a WiMAX frame timing structure 1054 illustrates three contiguous frames of WiMAX: a frame 1056, a frame 1058, and a frame 1060. Each of the three frames includes an UL sub-frame for communicating UL information and a DL sub-frame for communicating DL information. The duration for a DL sub-frame is 2.9 ms and the duration for an UL sub-frame is 1.8 ms. Additionally, the bandwidth for WiMAX is 10 MHz. In WiMAX frame timing structure 1054, frame 1056 includes a DL sub-frame 1062 (DL1) and an UL sub-frame 1064 (UL1), frame 1058 includes a DL sub-frame 1066 (DL2) and an UL sub-frame 1068 (UL2), and frame 1060 includes a DL sub-frame 1070 (DL3) and an UL sub-frame 1072 (UL3). The sequence of WiMAX frame timing structure 1054 repeats periodically with a period of three WiMAX frames. FIG. 10 illustrates a set of three WiMAX frames. The period of three WiMAX frames is same as the period of 24 Bluetooth slots. Moreover, relative time offset between WiMAX frame timing structure 1054 and Bluetooth SCO slot timing structure 1052 remains same in every repeating period.

DL sub-frame 1062 and UL sub-frame 1068 forms a relevant pair of sub-frames since DL sub-frame 1062 carries burst allocation information for allocations in UL sub-frame 1068. WiMAX has to receive DL sub-frame 1062 to use UL sub-frame 1068. Similarly, DL sub-frame 1066 and UL sub-frame 1072 form a relevant pair of sub-frames and DL sub-frame 1070 and UL sub-frame 1064 form a relevant pair of sub-frames.

WiMAX uses a sleep mode supporting co-located co-existence with MAP relevance for co-located coexistence Power Saving Class (PSC) bit set to one, sleep window set to two frames, and listening window set to one frame. In WiMAX frame timing structure 1054, frame 1056 is part of a listening window and frame 1058 and frame 1060 are part of a sleep window. Additionally, in WiMAX frame timing structure 1054, the relative start frame number of a first frame (i.e. frame 1058) in the sleep window is one, as the beginning of the sleep window is after one frame (i.e., frame 1056). The start frame number is frame number of frame 1058 plus relative start frame number plus non negative integer multiple of sum of the sleep window and the listening window.

In the sleep mode supporting co-located co-existence with MAP relevance for co-located coexistence PSC bit set to one, for communication, WiMAX uses all DL sub-frames in a listen window and does not use a DL sub-frame in a sleep window. Moreover in such case, WiMAX uses a first UL sub-frame of a first frame of a sleep window and does not use any other UL sub-frame in the sleep window. Also, WiMAX does not use a first UL sub-frame of a first frame of a listen window and uses all other UL sub-frames of the listen window for its communication. Therefore, in WiMAX frame timing structure 1054, the communication device uses DL sub-frame 1062 and UL sub-frame 1068 for communication. The communication device does not use UL sub-frame 1064, DL sub-frame 1066, DL sub-frame 1070, and UL sub-frame 1072 for its communication. Each of DL sub-frame 1062, DL sub-frame 1066, and DL sub-frame 1070 form a WiMAX communication event.

Further, clocks of Bluetooth and WiMAX are synchronized and the offset between beginning of slot 1028 of Bluetooth SCO slot timing structure 1052 and beginning of DL sub-frame 1062, which is the first frame of WiMAX frame timing structure 1054 can be any value depending on the CLKN. It is taken as zero in this exemplary embodiment as depicted in Bluetooth SCO slot timing structure 1052 and WiMAX frame timing structure 1054. With zero offset between Bluetooth SCO slot timing structure 1052 and WiMAX frame timing structure 1054, there is no relevant pair of sub-frames in WiMAX frame timing structure 1054 that is not interfered by one or more SCO slot pairs of Bluetooth SCO slot timing structure 1052.

First processor 902 determines information about duration of DL sub-frames, i.e., DL sub-frame 1062, DL sub-frame 1066, and DL sub-frame 1070 and UL sub-frames, i.e., UL sub-frame 1064, UL sub-frame 1068, and UL sub-frame 1072 used in WiMAX frame timing structure 1054. First processor 902 also determines information about start time and end time of DL sub-frames, i.e., DL sub-frame 1062, DL sub-frame 1066, and DL sub-frame 1070 and start time and end time of UL sub-frames, i.e., UL sub-frame 1064, UL sub-frame 1068, and UL sub-frame 1072 used in WiMAX frame timing structure 1054. The duration of DL sub-frame of 2.9 ms, the duration of UL sub-frame of 1.8 ms, WiMAX bandwidth of 10 MHz, start and end of the DL sub-frames and the UL sub-frames is communicated to second processor 904. Thereafter, based on the information, second processor 904 calculates a time offset between Bluetooth SCO slot timing structure 1052 and WiMAX frame timing structure 1054. Alternatively, second processor 904 may retrieve the time offset from a database based on the duration of DL sub-frame of 2.9 ms, the duration of UL sub-frame of 1.8 ms, and WiMAX bandwidth of 10 MHz. Based on the duration of DL sub-frames of 2.9 ms which is smaller than 3.302 ms, second processor 904 may retrieve a time offset of 0.010 ms. Thereafter, second processor 904 sets the time offset of 0.010 ms between the end of DL sub-frame 1062 and the beginning of slot 1034, as depicted in a Bluetooth SCO slot timing offset structure 1074. The time offset is set between slot 1034 and DL sub-frame 1062, as they are the nearest communication events across Bluetooth and WiMAX. Thereafter, the time offset of 0.010 ms is set by adding an offset to CLKN.

Therefore, Bluetooth SCO slot timing offset structure 1074 begins with slot 1004 instead of beginning with slot 1028. As a result of this, DL sub-frame 1062 interferes only with slot 1004, but since this is the case of simultaneous reception in WiMAX and Bluetooth, the interference is absent. Moreover, UL sub-frame 1068 does not interfere with any Bluetooth slot. Therefore, as shown in a Bluetooth-WiMAX sharing time structure 1078, slot 1004, slot 1034, slot 1010, slot 1040, slot 1016, slot 1046, slot 1022, and slot 1028 are used for Bluetooth communication. Subsequently, a relevant pair of sub-frames, i.e., DL sub-frame 1062 and UL sub-frame 1068 is used for WiMAX communication. The whole structure of FIG. 10 repeats after every 24 Bluetooth slots or three WiMAX frames. Since clocks of WiMAX and Bluetooth are synchronized the relative time offset between WiMAX frame and Bluetooth slots remains same once it is set to any value.

Various embodiments of the invention provide system and method for enabling coexistence between a plurality of communication technologies on a communication device. The method minimizes interference between the plurality of communication technologies. Moreover, in one of the embodiments the method may be implemented without the need to change the actual architecture of the plurality of communication technologies. Further, in one of the embodiments the method and system reduces the implementation cost as the plurality of communication technologies share various components of the communication device.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of coexistence of a plurality of communication technologies in a communication device, the method comprising:
   determining a time offset between a first communication event of a first communication technology of the plurality of communication technologies and a second communication event of a second communication technology of the plurality of communication technologies; and
   altering a first communication state of at least one of the first communication technology and the second communication technology to a second communication state based on at least one of the time offset and a plurality of parameters of at least one of the first communication technology and the second communication technology,
   wherein the first communication state and the second communication state each defines a different respective sequence of at least one of an availability period and an unavailability period.

2. The method of claim 1, wherein a communication technology of the plurality of communication technologies is one of a Bluetooth, a Worldwide Interoperability Microwave Access (WiMAX), a Wireless Metropolitan Area Network (WMAN), and a Wireless Local Area Network (WLAN).

3. The method of claim 1, wherein at least one of the time offset and the plurality of parameters is determined based on at least one signal of at least one of the first communication technology and the second communication technology.

4. The method of claim 1, wherein at least one parameter of the plurality of parameters is predefined.

5. The method of claim 1, wherein at least one parameter of the plurality of parameters is communicated between the first communication technology and the second communication technology in at least one message.

6. The method of claim 1, wherein the time offset is determined based on the plurality of parameters.

7. The method of claim 1, wherein the time offset is determined between one of beginning and end of the first communication event and one of beginning and end of the second communication event.

8. The method of claim 1, wherein the availability period corresponds to a listening window and the unavailability period corresponds to a sleep window.

9. The method of claim 1 further comprising sending at least one communication message to a Base Station (BS) to alter the first communication state of at least one of the first communication technology and the second communication technology.

10. The method of claim 9, wherein the at least one communication message comprises information corresponding to at least one of a listening window, a sleep window, and a start frame number.

11. The method of claim 10, wherein the first communication state is altered at the beginning of a frame, wherein a frame number of the frame is equal to the start frame number.

12. The method of claim 1, wherein the second communication event is one of an eSCO reserved slot, an eSCO retransmission slot, a SCO slot, an eSCO slot pair, a SCO slot pair, a WeSCO interval, a TeSCO interval, and a TSCO interval.

13. The method of claim 1, wherein the first communication event is one of a DL sub-frame and an UL sub-frame.

14. The method of claim 1, wherein at least one of the time offset and the plurality of parameters is determined periodically.

15. The method of claim 1, wherein the first communication state is altered periodically.

16. The method of claim 1 further comprising retrieving the second communication state from a database based on the time offset and the plurality of parameters.

17. An apparatus supporting a plurality of communication technologies, the apparatus comprising:
   a processor configured to:
      determine a time offset between a first communication event of a first communication technology of the plurality of communication technologies and a second communication event of a second communication technology of the plurality of communication technologies; and
      alter a first communication state of at least one of the first communication technology and the second communication technology to a second communication state based on at least one of the time offset and a plurality of parameters of at least one of the first communication technology and the second communication technology,
      wherein the first communication state and the second communication state each defines a different respective sequence of at least one of an availability period and an unavailability period wherein a parameter of the plurality of parameters is one of a Synchronous Connection Oriented periodicity (TSCO) interval, an enhanced Synchronous Connection Oriented periodicity (TeSCO) interval, duration of a Down-Link (DL) sub-frame, duration of an Up-Link (UL) sub-frame, an enhanced SCO retransmission Window (WeSCO) interval, and a bandwidth.

18. The apparatus of claim 17, wherein the processor is further configured to retrieve the second communication state from a database based on the time offset and the plurality of parameters.

19. The apparatus of claim 17, wherein the processor is further configured to send at least one communication message to a base station (BS) to alter the first communication state of at least one of the first communication technology and the second communication technology.

20. The apparatus of claim 19, wherein the at least one communication message comprises information corresponding to at least one of a listening window, a sleep window, and a start frame number.

21. The apparatus of claim 17, wherein the apparatus is a Mobile Station (MS).

22. A system for coexistence of a plurality of communication technologies, the system comprising:
a communication device configured to determine a time offset between a first communication event of a first communication technology of the plurality of communication technologies and a second communication event of a second communication technology of the plurality of communication technologies; and
a base station (BS) operatively coupled with the communication device, the BS configured to alter a first communication state of at least one of the first communication technology and the second communication technology to a second communication state based on at least one of the time offset and a plurality of parameters of at least one of the first communication technology and the second communication technology,
wherein the first communication state and the second communication state each defines a different respective sequence of at least one of an availability period and an unavailability period wherein a parameter of the plurality of parameters is one of a Synchronous Connection Oriented periodicity (TSCO) interval, an enhanced Synchronous Connection Oriented periodicity (TeSCO) interval, duration of a Down-Link (DL) sub-frame, duration of an Up-Link (UL) sub-frame, an enhanced SCO retransmission Window (WeSCO) interval, and a bandwidth.

23. The system of claim 22, wherein the BS is further configured to retrieve the second communication state from a database based on the time offset and the plurality of parameters.

24. A method of coexistence of a plurality of communication technologies in a communication device, clocks of the plurality of communication technologies being synchronized, the method comprising:
determining at least one of DownLink (DL) information and UpLink (UL) information of a first communication technology of the plurality of communication technologies; and
setting a time offset between a first communication event of the first communication technology of the plurality of communication technologies and a second communication event of a second communication technology of the plurality of communication technologies based on the at least one of the DL information, the UL information and a plurality of parameters wherein a parameter of the plurality of parameters is one of a Synchronous Connection Oriented periodicity (TSCO) interval, an enhanced Synchronous Connection Oriented periodicity (TeSCO) interval, duration of a DL sub-frame, duration of an UL sub-frame, an enhanced SCO re-transmission Window (WeSCO) interval, and a bandwidth.

25. The method of claim 24, wherein each of the plurality of communication technologies are one of a Bluetooth, a Worldwide Interoperability Microwave Access (WiMAX), a Wireless Local Area Network (WLAN), and a Wireless Metropolitan Area Network (WMAN).

26. The method of claim 24, wherein the time offset is set between one of beginning and end of the first communication event and one of beginning and end of the second communication event.

27. The method of claim 24, wherein the first communication event is one of a DL sub-frame and an UL sub-frame.

28. The method of claim 24, wherein the second communication event is one of a transmission slot and a reception slot.

29. The method of claim 24 further comprising retrieving at least one of the time offset, the first communication event, and the second communication event from a database based on at least one of the DL information, the UL information, and the plurality of parameters.

30. The method of claim 24, wherein the DL information is duration of a DL sub-frame and the UL information is duration of an UL sub-frame.

31. The method of claim 24, wherein the DL information is at least one of beginning time and end time of a DL sub-frame and the UL information is at least one of beginning time and end time of an UL sub-frame.

32. An apparatus supporting a plurality of communication technologies, clocks of the plurality of communication technologies being synchronized, the apparatus comprising:
a first processor configured to determine at least one of DownLink (DL) information and UpLink (UL) information of a first communication technology of the plurality of communication technologies; and
a second processor configured to set a time offset between a first communication event of the first communication technology of the plurality of communication technologies and a second communication event of a second communication technology of the plurality of communication technologies based on the at least one of DL information, UL information, and a plurality of parameters wherein a parameter of the plurality of parameters is one of a Synchronous Connection Oriented periodicity (TSCO) interval, an enhanced Synchronous Connection Oriented periodicity (TeSCO) interval, duration of a DL sub-frame, duration of an UL sub-frame, an enhanced SCO re-transmission Window (WeSCO) interval, and a bandwidth.

33. The apparatus of claim 32, wherein the second processor is further configured to retrieve the time offset from a database based on the DL information, the UL information, and the plurality of parameters.

34. The apparatus of claim 32, wherein the apparatus is a Mobile Station (MS).

* * * * *

UNITED STATES PATENT AND TRADEMARK OFFICE
CERTIFICATE OF CORRECTION

| | | |
|---|---|---|
| PATENT NO. | : 8,219,142 B2 | Page 1 of 1 |
| APPLICATION NO. | : 12/322216 | |
| DATED | : July 10, 2012 | |
| INVENTOR(S) | : Khairmode et al. | |

It is certified that error appears in the above-identified patent and that said Letters Patent is hereby corrected as shown below:

Column 13, Line 62, after "unavailability period," please insert --wherein a parameter of the plurality of parameters is one of a Synchronous Connection Oriented periodicity (TSCO) interval, an enhanced Synchronous Connection Oriented periodicity (TeSCO) interval, duration of a Downlink (DL) sub-frame, duration of a Uplink (UL) sub-frame, an enhanced SCO retransmission Window (WeSCO) interval, and a bandwidth--.

Signed and Sealed this
Thirtieth Day of October, 2012

David J. Kappos
*Director of the United States Patent and Trademark Office*